J. M. WASHBURN & J. A. SPANGLER.
HAY RAKE AND LOADER.
APPLICATION FILED JAN. 27, 1915.
1,181,096.
Patented Apr. 25, 1916.
5 SHEETS—SHEET 5.
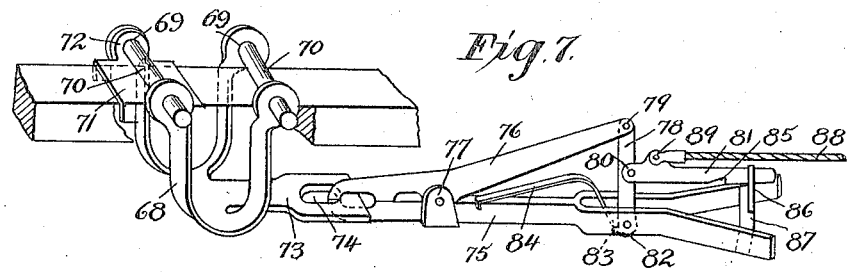
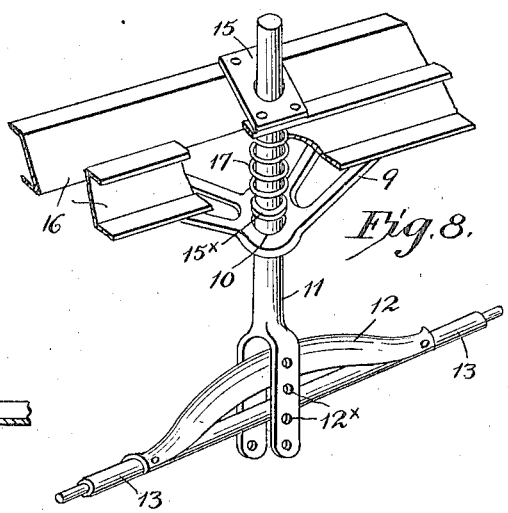
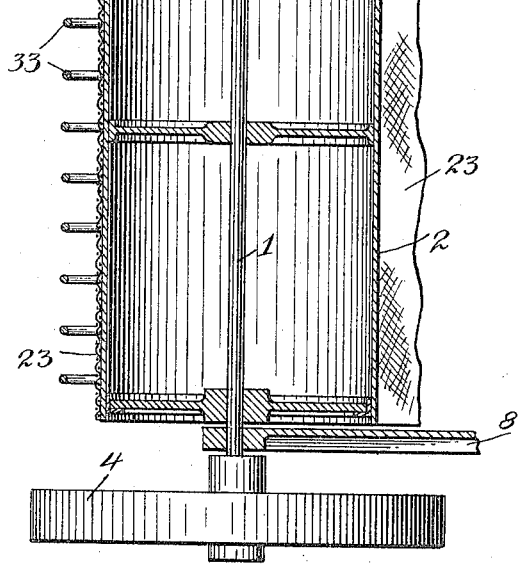
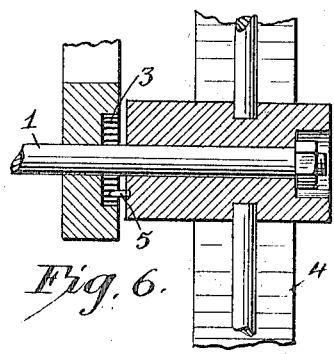
Inventors:
John M. Washburn
John A. Spangler.

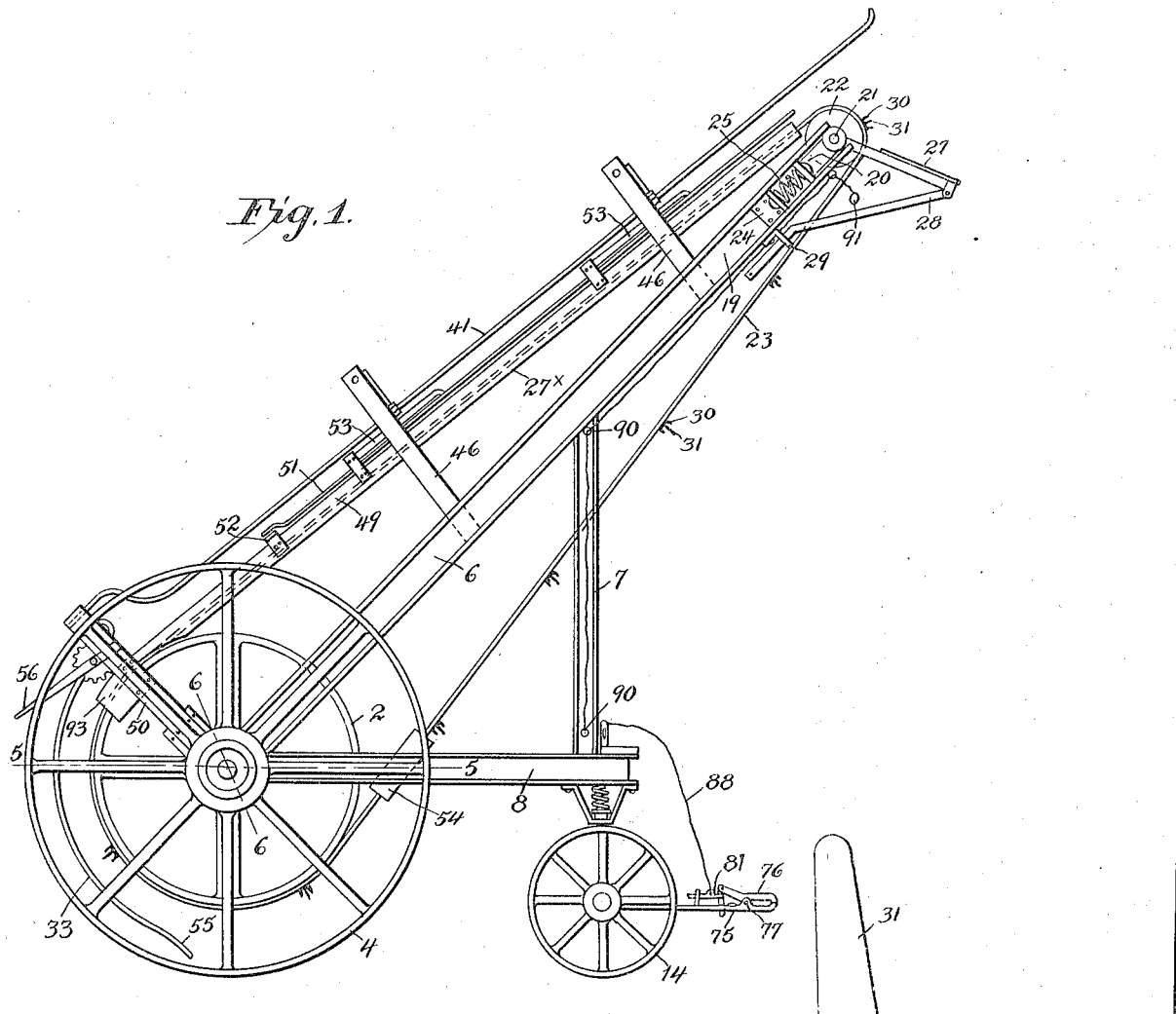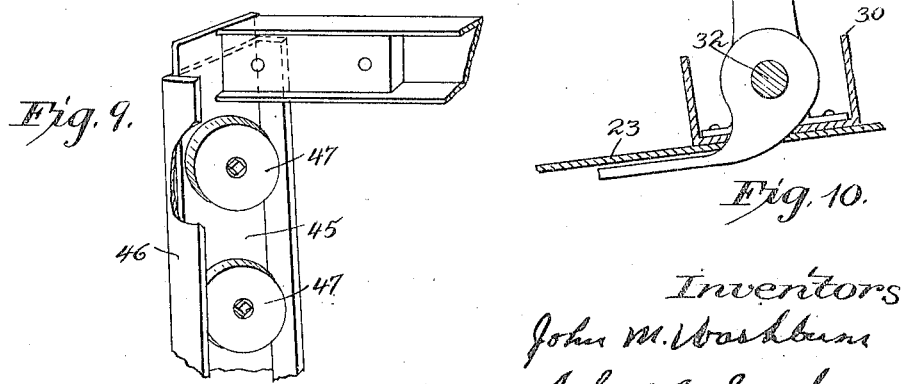

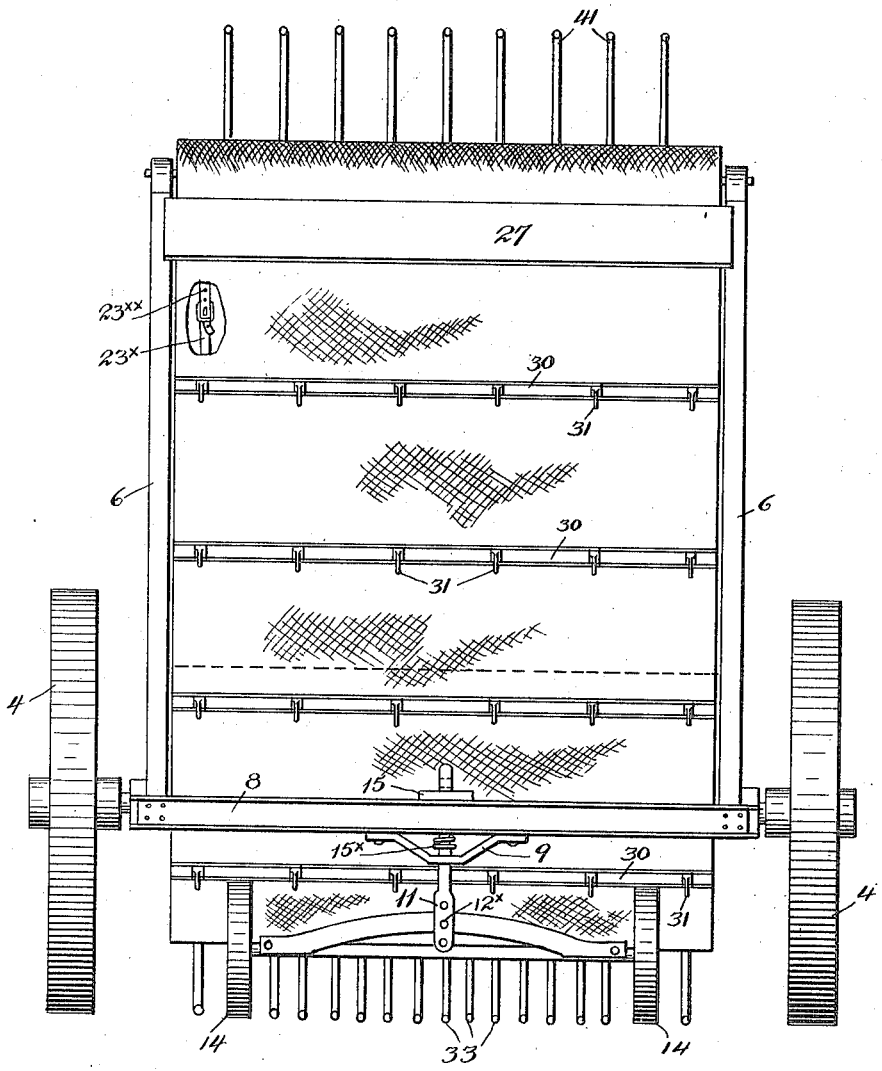
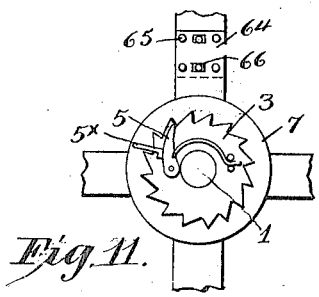

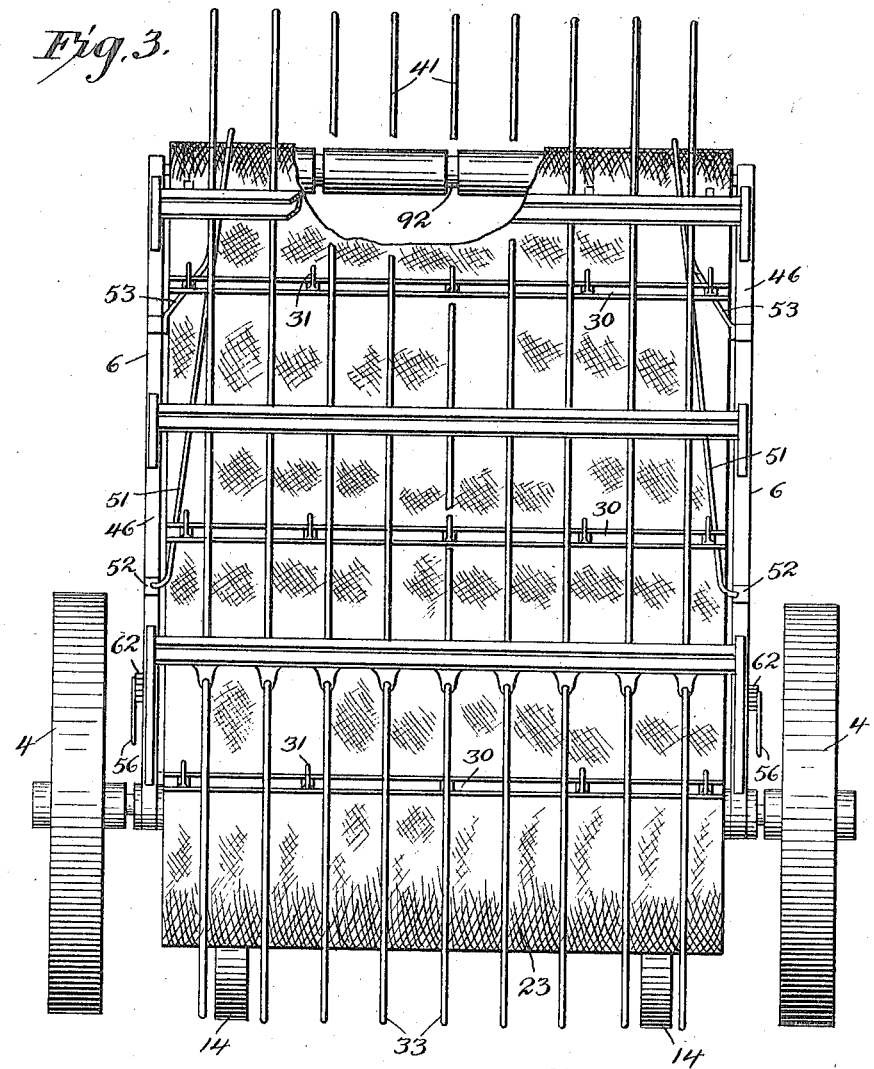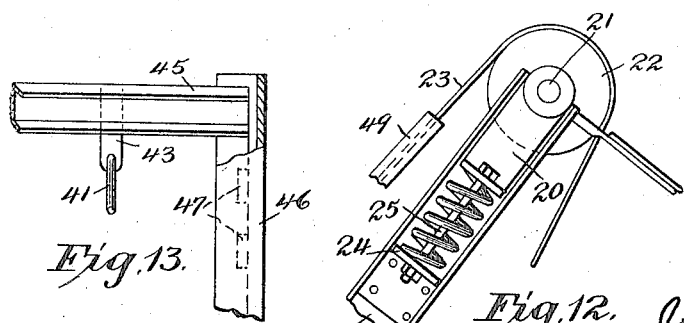

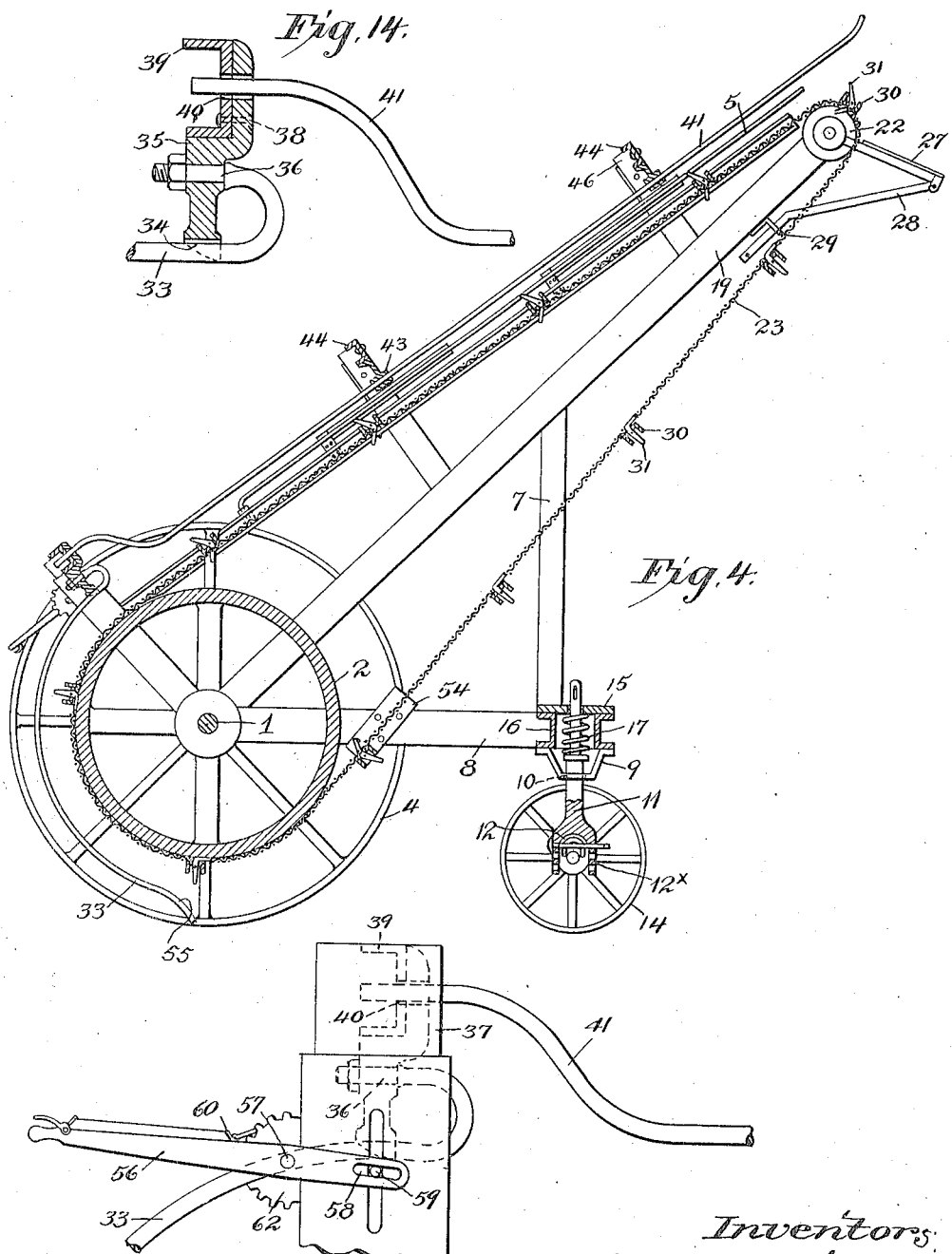

UNITED STATES PATENT OFFICE.

JOHN M. WASHBURN AND JOHN A. SPANGLER, OF ATTICA, INDIANA, ASSIGNORS TO THE SHAWNEE MANUFACTURING COMPANY OF INDIANA, OF ATTICA, INDIANA.

HAY RAKE AND LOADER.

1,181,096.     Specification of Letters Patent.     Patented Apr. 25, 1916.

Application filed January 27, 1915. Serial No. 4,772.

*To all whom it may concern:*

Be it known that we, JOHN M. WASHBURN and JOHN A. SPANGLER, citizens of the United States, residing at Attica, in the county of Fountain and State of Indiana, have invented certain new and useful Improvements in Hay Rakes and Loaders; and we do hereby declare the following to be a full, clear, and exact description of the invention, such as will enable others skilled in the art to which it appertains to make and use the same, reference being had to the drawings, and to the letters and figures of reference marked thereon, which form a part of this specification.

This invention relates to new and useful improvements in raking and loading apparatus for hay and grain, and consists of all steel galvanized construction, excepting the canvas conveyer and rope for releasing the apparatus from a wagon, and comprises various details of construction, combinations, and arrangements of parts, which will be hereinafter fully described, shown in the drawings, and then specifically defined in the appended claims.

Our invention is illustrated in the drawings, in which:—

Figure 1 is a side elevation of our improved loading apparatus. Fig. 2 is a front elevation. Fig. 3 is a rear elevation. Fig. 4 is a vertical sectional view. Fig. 5 is a sectional view taken on a line 5—5, of Fig. 1. Fig. 6 is a view taken on a line 6—6, of Fig. 1. Fig. 7 is a detail in elevation showing the means for connecting the device to a wagon. Fig. 8 is an enlarged detail view of buffer means over the forward axle of the machine. Fig. 9 is a detail sectional view showing the adjustment of the guide rod holding members. Fig. 10 is an enlarged detail view showing the pivotal hay engaging fingers. Fig. 11 is a detail view of the pawl releasing device, and Figs. 12 to 15, are detail views showing different parts of the apparatus, in which Fig. 12, is a detail sectional view showing bearing plates and tension springs. Fig. 13, is a sectional view showing a section of the crossbar and bracket carrying the conveyer guide rods. Fig. 14, is a detail sectional view showing the crossbar and bracket carrying the rake teeth and lowermost end of the conveying guide rod. Fig. 15, is a detail sectional view showing the lever mechanism for adjusting the bar carrying the rake teeth.

Reference now being had to the details of the drawings by numeral, 1 designates the rear axle of the apparatus, to which the cylindrical roller 2 is affixed, and 3 designates a series of ratchet teeth upon the roller, and 4 is a driving wheel which is journaled upon the axle and carries the spring pressed pawl 5, adapted to engage said ratchet wheel upon the hub, to cause the cylindrical roller to move in one direction only, the pawl turning idly on a reverse rotary movement. A pawl lifting member $5^\times$, is so positioned, that when its outer end is turned, the pawl may be thrown out of engagement with the said ratchet teeth 3, thus throwing the apparatus out of gear. Said axle 1, is mounted upon the frame 6, preferably of channel steel, and which has supporting bars 7. A horizontally disposed portion of the frame 8, also of channel steel, has a bracket member 9, secured to the under surface of the frame 8, and which is apertured as at 10, for the reception of the post 11, which latter is secured to the yoke 12, by means of a pin $12^\times$ reposing in any one set of the apertures in the lower forked end of the post 11, and the aperture in the yoke 12, which yoke is in turn secured to the forward axle 13, upon the ends of which the small wheels 14 are journaled. A plate 15, is secured to the upper surface of the crosspieces of the frame 16. Said plate is apertured for the reception of the upper end of the post 11. A coil compression spring 17, is fitted around the post 11, and bearing against the under surface of the plate 15, and against the collar $15^\times$, mounted upon the post 11, forming a buffer means for the forward part of the machine.

Mounted in suitable bearings at the upper ends of the inclined channel bars 19 of the frame, are the bearing plates 20, which have spindle receiving ends 21, for the reception of the spindle ends of the roller 22, and carried therein, and over which roller the canvas conveyer 23, travels. Straps $23^\times$, on which are mounted buckles, are secured to one end of the canvas conveyer, and straps $23^{\times\times}$, are secured to the opposite end of the conveyer, and are adapted to engage the buckles, thus forming an endless conveyer. Said bearing member 20, has an outwardly projecting portion between which, and a laterally projecting member 24, upon the bar 19, a tension spring 25 is mounted, and which serves to hold the canvas conveyer taut, there being one of said springs mounted upon either side of the frame.

An apron 27, is hinged to the spindle ends of the roller 22 at one edge, and its other end is pivotally mounted upon the bracket members 28, which latter pass through a loop 29, said bracket members serving to slide back and forth, through the loops 29, similar arrangements being provided upon either side of frame. Said apron 27 serves as a means for preventing the hay being elevated, from being drawn down from the load by the endless carrier, and the hay engaging fingers.

A deck 27×, is positioned under the canvas conveyer, with which it is adapted to engage and support, to prevent sagging of the canvas conveyer, when the weight of the hay comes upon it. Channel strips are secured transversely upon the endless canvas conveyer, and L shaped elevating members 31 are pivotally mounted upon pins 32, which are so secured to said strips 30, that when the elevating members are moving upward, as in the act of carrying hay, they will tilt by gravity, so that the long portion of the L shaped member, will be at an inclination, and will rest against one edge of the strips 30, but when the short portion of the L shaped member, which passes through apertures in the channel strips 30, comes in contact with the circumference of the cylindrical roller 2, said L shaped members 31, will be held rigidly in radial positions with reference to the roller, thus causing the hay to be elevated thereby.

A series of curved rake teeth 33, are secured at their upper ends in apertures 36, in the brackets 35, the lower ends of the brackets 35, being provided with elongated apertures 34, for the reception of the curved rake teeth 33, and in which the latter is allowed to have movement. Said brackets 35, are secured by means of bolts, or otherwise, to the cross bar 39, having apertures 40 therein, for the reception of the conveyer guide rods 41, each of which passes through registering apertures in the upper portion of the bracket, and the bar 39. Said bars 41, are bent at their lowermost ends, preferably of the shape shown in the drawings, and extend side by side, and are disposed at inclinations, and spaced apart a slight distance from the upper portion of the conveyer. Rods 41, are secured to the lower ends of the brackets 43, the upper ends of said brackets being secured to the cross bars 44, and which latter are fastened at their ends to plates 45, mounted on, and having a longitudinal movement between the flanges of the side channel supporting bars 46, which are secured to the side bars 19. Antifriction rollers 47, are pivotally mounted upon the plate 45, and bear against the flanges of the bars 46, to reduce the friction incident to the movement of the plates 45. The conveying rods 41, the upper free ends of which extend beyond the end of the endless conveyer 23, the lower ends of said rods 41, passing through apertures in the cross bar 39, and through which they are adapted to extend a short distance, and in which they are allowed to have movement, and the rods 41, are adapted to be lifted, and have movement through the medium of the antifriction rollers 47, when hay or other material of considerable quantity is being elevated by bearing frictionally against the under portion of the rods.

49 are bars, forming a part of the frame, and which are fastened to the bars 50 and 46, and 51, are rods pivotally mounted in apertures in the plates 52, secured to the bars 49. The rods 51, tend to force the hay, or other material being elevated toward the center of the conveyer, and springs 53, secured to the bars 49, bear yieldingly against the rods 51. The upper portions of the bars 49, tend to guide the upper portion of the conveyer 23, while plates 54, secured to the frame in advance of the roller 2, serve to guide the lower part of the conveyer 23. The curve of the rake teeth 33, is of the same radius as the roller 2, to a point near its lower end, where it is bent at an angle as shown at 55. This angle is for the purpose of allowing the roller to be carried higher from the ground than it otherwise would be, were the teeth of the same radius as the roller to its extreme end.

Levers 56, are pivotally mounted upon pins 57. Each lever is provided with a slot 58, having sliding pivotal connections with a pin 59, upon the sliding bar 37, and a pawl 60, carried by the levers, to engage one or another of the notches in the segment 62. The purpose of the said levers is to lower, and raise the said bar 39, which carries the various rake teeth.

Plates 64, forming a part of the frame, have bolt apertures 65, formed therein, and through which bolts 66 pass, and which latter may be held in different sets of apertures in the plate 64, accordingly as may be desired to hold the supporting bar carrying the rake teeth, and lever mechanism, forward or rearward.

The means for connecting the hay loading apparatus to a wagon is shown in the drawings, and in which 68, designates a hitching clamp adapted to engage with the rear axle from underneath the same, said clamping member being provided with eyes 69, through which the horizontally disposed pins 70 pass, and which are adapted to rest upon the plate 71, which rests upon the reach of the wagon, said plate 71, preventing the pins from cutting or wearing the reach. The plate 71, is provided with upwardly turned ears 72, through which the pins 70 pass, and which serve to hold the same in place, said clamping member has a horizontally disposed projection 73, which is apertured as at 74. A forked tongue 75, is adapted to be fastened pivotally to the forward truck of the machine, and has a lever 76, pivotally mounted upon the pin 77, the end of said lever 76, and shank 75, forming the jaws which are adapted to engage the aperture 74. One end of the lever 76, is pivotally connected to a link 78, through the medium of the pin 79, said link 78 being pivotally connected to a pin 80, carried by the bar 81, and which pin 80, has also pivotally connected thereto a second link 82, pivoted with a laterally extending lug 83, at one end. A spring 84, is fastened at one end to the upper edge of the shank portion of the forked member 75, and its other end frictionally engages the lug 83, and tends to hold the two links 78 and 82, in alinement with each other, and the jaws formed at the forward end of the lever 76, and the bar 78, in locked relation with the apertured extension 73. Said bar 81, has a notch 85, formed in its under edge, and has a sliding movement through slot in a bar 86, which rises from crosspiece 87, between the forked portions of the bar 75, said notch being adapted, when in one position, to engage over one edge of the slot through which it passes to hold the two links at inclinations to each other, which will cause the jaws to be out of engaging relation with the aperture in the extension 73. A rope 88, is fastened at one end in an aperture 89, upon the bar 81, and passes through eyes 90, and extends up to a location near the upper end of the conveyer, and has for convenience a ring 91 fastened thereto, through the medium of which, when the rope is pulled upon, the jaws may be separated from each other to disconnect the apparatus from the wagon, the jaws being held open in readiness for the next succeeding hitch. By raising one end of the bar 81, so that the notch 85, will disconnect from the edge of the slot through which the bar 81 passes, the spring 84, will throw the two links 78 and 82, in alinement with each other and the jaws at the end of the lever 76, and the end of the bar 75, will again be thrown into engaging relation with the aperture in the clamping member.

A conveyer roller 22, carried and positioned at the top of the frame is provided with a series of registering apertures 92, cut in its circumference. Said apertures are distanced apart to correspond with the hay engaging fingers, or elevating members 31, through which apertures the short ends of the L shaped elevating members 31, are adapted to pass, that they may retain their inclined position as they pass about the roller 22, that they may become easily disengaged from the hay being elevated.

Secured to the bars 50, which carries the bar 39, supporting the rake teeth, are guides 93, which are extensions of bars 49, and are provided for the purpose of guiding the hay being conveyed around the rake teeth, within the width of the conveyer, and to prevent the edges of the hay being thus conveyed, from engaging with the driving wheels, similar means being provided upon either side of the frame.

The operation of our invention will be readily understood, and is as follows:—A roller, or drum is mounted upon, and revolves with the through axle, the drum being a short distance ahead of the raking teeth, which are of the same radius as the drum. A conveyer supplied with L shaped hay engaging fingers, and channel canvas strips, pass about this drum and the small roller at the top of the frame. The drum turning with the wheels and through axle shaft causes the top portion of the conveyer canvas to move upward. As the raking teeth gather the hay, it enters the space between the raking teeth and drum, coming in contact with the canvas conveyer carrying the L shaped hay engaging members and the channel canvas strips, which canvas conveyer carrying the L shaped hay engaging members and strips, together with the natural movement of the hay, or other grain being elevated, conveys the hay around the drum and raking teeth to the top of the canvas conveyer, by which the hay is conveyed on up the incline to the load.

What we claim to be new and desire to secure by Letters Patent is:—

1. A hay raking and loading apparatus comprising a frame and wheels upon which the same is mounted, a rotatable drum having gear connections with said wheels, a spring pressed bearing member upon the frame, a roller journaled in said member and having registering apertures cut in its circumference and distanced apart therein, an endless conveyer passing about said drum and roller, an adjustable apron adjacent to said roller, hay engaging fingers upon said conveyer and distanced apart to correspond with the apertures cut in the circumference of said roller, a lever actuated bar upon the frame and rake teeth supported by said bar, and adjustable guide rods having bent ends and positioned above the conveyer, and means for guiding the hay being raised within the width of the conveyer.

2. A hay raking and loading apparatus comprising a frame and wheels upon which the same is mounted, a rotatable drum having gear connections with said wheels, a roller upon the frame, an endless conveyer passing about said drum and roller, hay engaging members upon said conveyer, a lever actuated bar upon the frame, and curved rake teeth carried by said bar, adjustable guide rods positioned above the conveyer, and pivotal spring pressed guide rods positioned upon either side of the frame and above the conveyer.

3. A hay raking and loading apparatus comprising a frame and wheels upon which the same is mounted, a rotatable drum having gear connections with said wheels, a roller upon the frame, an endless conveyer passing about said drum and roller, pivotally mounted L shaped hay engaging fingers and pins upon which the same are mounted, a lever actuated bar upon the frame and curved rake teeth supported by said bar, guide rods mounted at their corresponding ends in said rake tooth supporting bar, crosspieces upon the frame, brackets secured to the crosspieces, guide rods secured to the brackets, automatic means for moving guide rods that they may adjust themselves to any quantity of hay being elevated, plates secured to the frame, rods pivotally connected to said plates, and springs bearing against the rods, and adapted to narrow the stream of hay being raised by the conveyer.

4. A hay raking and loading apparatus comprising a frame and wheels upon which the same is mounted, a rotatable drum having gear connections with said wheels, a roller upon the frame, an endless conveyer passing about said drum and roller, a deck underneath the conveyer frictionally engaging the same, hay engaging members upon said conveyer, a lever actuated bar upon the frame and rake teeth supported by said bar, guide rods mounted in the bar supporting the rake teeth, crosspieces upon the frame, plates secured to the crosspieces, antifriction rollers pivotally mounted upon said plates, channel members upon the frame engaging the anti-friction rollers, permitting the guide rods through the medium of their frictional engagement with the hay to have a floating movement, and means upon either side of the frame for guiding the hay being raised by the conveyer.

5. A hay raking and loading apparatus comprising a frame with driving wheels and axle upon which the same is mounted, a spring pressed pawl upon the wheel, a drum secured upon said axle and positioned in front of the curved rake teeth and rotating near the inner circumference of the arc formed by the curved rake teeth, and ratchet teeth upon the drum engaged by said pawl, means for throwing the latter out of engagement with the ratchet teeth, a spring pressed roller upon the frame, an endless conveyer passing about said drum and roller, means upon either side of the frame for guiding the conveyer, pivotally mounted L shaped hay engaging members upon the conveyer, an adjustable apron adjacent to said roller, an adjustable cross bar upon the frame, rake teeth supported by said cross-bar, means upon the frame for adjusting the said cross-bar relative to its back and forward movement, a plate upon the frame, a bracket secured to the frame, post passing through apertures in bracket and plate, post pivotally connected to yoke which is secured to axle, and wheels upon which the same is mounted affording means carrying the forward end of the machine, a collar upon the post, buffer means mounted upon the post which latter being provided with registering apertures affording a means for adjusting the forward end of the machine relative to height, adjustable cross-bars upon the frame, floating guide rods supported by said cross-bars and positioned over the conveyer.

6. A hay raking and loading apparatus comprising a frame of galvanized steel construction, and driving wheels and axle upon which the same is mounted, a cylindrical drum affixed to said axle and positioned in front of the curved rake teeth, and turning with the wheels and axle near the inner circumference of the arc formed by the curved rake teeth, said rake teeth being of the same radius as the cylindrical drum, an apron hinged to the spindle ends of a spring pressed roller, an endless canvas conveyer passing about said drum and roller, and means for narrowing the stream of hay being elevated, substantially as shown and described.

7. A hay raking and loading apparatus comprising a frame, an endless conveyer thereon, rake teeth, and floating guide rods above the conveyer, a tongue pivotally attached to the front axle of the machine, spring pressed jaws mounted upon the tongue, and an apertured clamping member adapted to be fastened to the axle and reach of a wagon, and to which said jaws are adapted to be connected.

8. A hay raking and loading apparatus comprising a frame, an endless conveyer thereon, rake teeth and floating guide rods above the conveyer, a forked tongue pivotally connected to the front axle of the machine, links pivoted together, a lever pivoted to one of said links and which lever has pivotal connections with the tongue, the latter and the lever forming jaws, a bar pivoted to said links, a rope connected to the bar and extending to the top of the frame, a notch upon the bar and a loop through which the bar passes and adapted to be engaged by said notch, a spring bearing against one of said links, and a clamping member for attachment to the axle and reach of a wagon.

9. A hay raking and loading apparatus comprising a frame, an endless conveyer thereon, rake teeth, and floating guide rods above the conveyer, a forked tongue pivotally connected to the front axle of the machine, links pivoted together, a lever pivoted to one of said links and which lever has pivotal connection with the tongue, the latter and the lever forming jaws, a bar pivoted to said links, a rope connected to the bar and extending through eyes secured to the frame to the top portion of the machine, a notch upon the bar and a loop through which the bar passes and adapted to be engaged by said notch, a spring bearing against one of said links, a clamping member having an apertured lateral extension for engagement with said jaw, pins for supporting the clamping member over the axle and reach of the wagon, and a plate supporting said clamping member upon the reach of the wagon.

In testimony whereof we hereunto affix our signatures in the presence of two witnesses.

JOHN M. WASHBURN.
JOHN A. SPANGLER.

Witnesses:
R. C. WEATHERFORD,
MORRIS BLORET.

Copies of this patent may be obtained for five cents each, by addressing the "Commissioner of Patents, Washington, D. C."